United States Patent [19]
Jones et al.

[11] Patent Number: 5,482,424
[45] Date of Patent: Jan. 9, 1996

[54] CAR RACK FOR WHEELCHAIRS AND THE LIKE

[75] Inventors: David L. Jones, Houston; George L. Drenner, Jr., Sugarland, both of Tex.

[73] Assignee: Mobility Plus, Inc., Houston, Tex.

[21] Appl. No.: 380,658

[22] Filed: Jan. 30, 1995

[51] Int. Cl.⁶ .................................................. B60P 3/06
[52] U.S. Cl. .................... 414/462; 224/510; 224/521; 224/536; 224/532; 414/540
[58] Field of Search .................. 224/42.44, 42.07; 414/462, 540, 921

[56] References Cited

U.S. PATENT DOCUMENTS

| | | |
|---|---|---|
| 3,800,967 | 4/1974 | Kosecoff. |
| 3,937,376 | 2/1976 | Ewing ................................ 224/42.08 |
| 4,084,736 | 4/1978 | Jacobs, Jr. ......................... 224/42.03 B |
| 4,213,729 | 7/1980 | Cowles et al. ......................... 414/462 |
| 4,297,069 | 10/1981 | Worthington ........................... 414/462 |
| 4,411,580 | 10/1983 | Kelly ...................................... 414/462 |
| 4,565,482 | 1/1986 | Baker .................................. 414/921 X |
| 4,705,448 | 11/1987 | Mungons ................................ 414/462 |
| 4,738,581 | 4/1988 | Kuhlman .............................. 414/921 X |
| 4,741,660 | 5/1988 | Kent ...................................... 414/462 |
| 4,941,799 | 7/1990 | Gordon et al. ......................... 414/678 |
| 5,011,361 | 4/1991 | Peterson ................................. 414/462 |
| 5,205,700 | 4/1993 | Lin et al. ............................. 414/921 X |
| 5,328,066 | 7/1994 | Cappuccio et al. .................. 414/462 X |

OTHER PUBLICATIONS

Bruno Independent Living Aids, Inc., Bruno AWL-1610, *Back-Saver Swing Away*™, 1993.

Bruno Independent Living Aids, Inc. Bruno AWL-1600, *Back-Saver*™, 1993.

Wheel-Chair Carrier Inc., *Tilt N Tote*, date unknown, but believed to be prior art.

*Primary Examiner*—Michael S. Huppert
*Assistant Examiner*—Janice L. Krizek
*Attorney, Agent, or Firm*—Vaden, Eickenroht, Thompson & Feather

[57] ABSTRACT

A rack is disclosed for mounting on the rear of a car for carrying a wheelchair. The wheelchair has a seat supporting framework that includes two parallel horizontal frame members close to the ground. The rack includes a pair of chair support members for engaging the two horizontal frame members with the chair on the ground and powered lift members for raising the chair to a traveling position above the ground and for lowering the chair downwardly to the ground for removing the chair from the rack thereby eliminating any need for anyone to lift the chair.

5 Claims, 3 Drawing Sheets

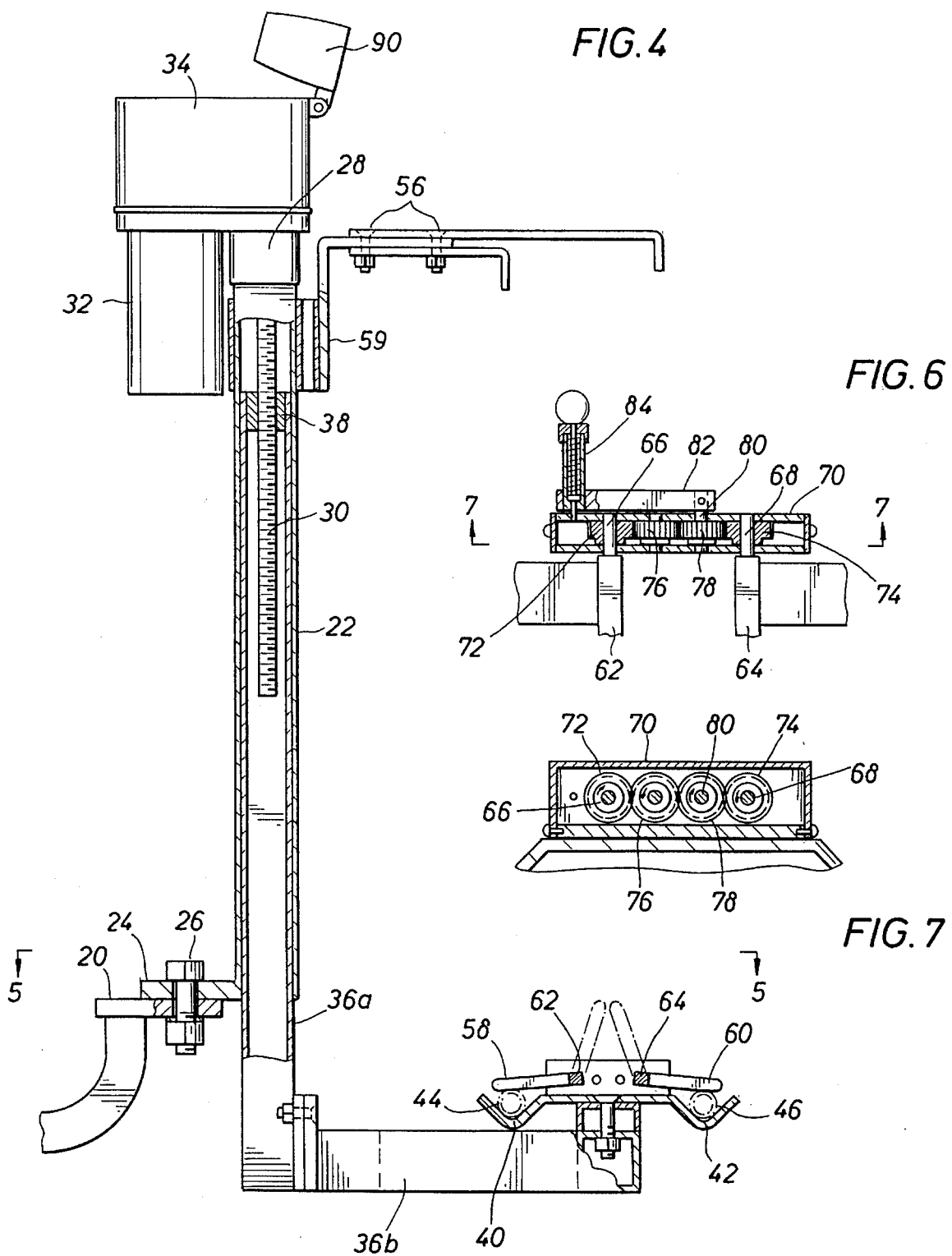

CAR RACK FOR WHEELCHAIRS AND THE LIKE

This invention relates to a rack for mounting on the back of an automobile (car) for carrying wheelchairs and the like.

Whenever a person confined to a wheelchair has to make an automobile trip, the person driving has to somehow get the wheelchair in the automobile so that it will be there when they reach their destination. Most automobiles are not designed with the idea in mind of having to also carry a wheelchair. The only two places this can be done in most automobiles is behind the front seat or in the trunk, if the trunk happens to be big enough. If it is, then the driver can fold up the wheelchair, lift it up and put it in the trunk. If the trunk is not big enough, then it has to go behind the front seat and as everyone knows that has tried it, it's a major hassle to get a wheelchair in the back seat of an automobile, compounding the problem is the fact that usually the person driving is the husband or the wife of the handicapped person and is close in age. These people are not themselves as strong as they once were, which makes the job of moving a wheelchair into and out of a car much more difficult.

Therefore, it is an object of this invention to provide a wheelchair rack for mounting on the rear of an automobile that will allow one person to attach the wheelchair to the rack while the wheelchair is resting on the ground, to raise the chair to a traveling position above the ground, and upon reaching their destination, to lower the chair back to the ground where the wheelchair can be removed from the rack all without having to lift the wheelchair.

It is a further object of this invention to provide such a rack to allow one person, even though frail, to load and unload a wheelchair onto and off of the rack of this invention.

It is a further object and advantage of this invention to provide such a rack that can be quickly and easily mounted on the rear of an automobile using a slip-hitch type trailer hitch.

It is a further object of this invention to provide such a rack that is supported solely by the trailer hitch that is attached to the underside of an automobile and, therefore, does not require drilling holes in the trunk or other body parts in order to mount the rack on the automobile.

These and other objects, features, and advantages of this invention will be apparent to those skilled in the art from a consideration of this specification including the attached drawings and appended claims.

IN THE DRAWINGS

FIG. 4 is a side view of the rack, on an enlarged scale, partly in section and partly in elevation.

FIG. 6 is a top view partly in section and partly in elevation of the latch assembly for moving fingers into and out of engagement with the frame of the chair to hold the chair on the rack.

FIG. 7 is a sectional view taken along line 7—7 of FIG. 6.

One of the advantages and features of this invention is that it can be mounted on the back of an automobile without having to drill any holes in the trunk lid or rear panels of the car body.

Figure 1:
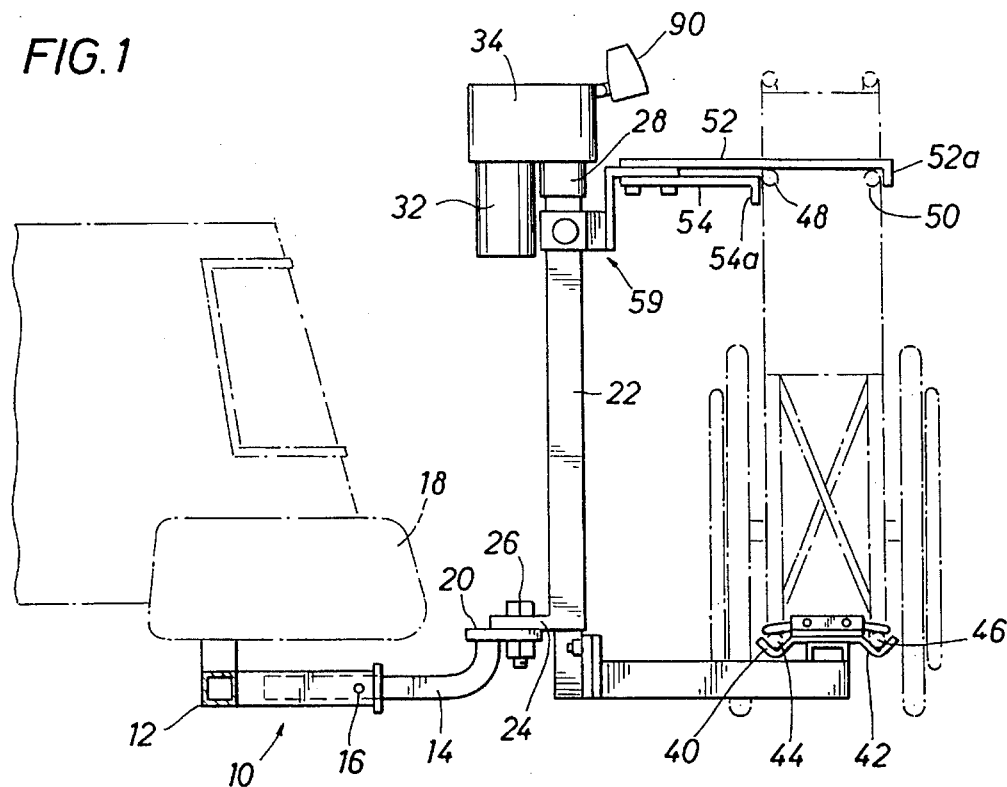
FIG. 1 is a side view of the rack of this invention in its traveling position supporting a folded wheelchair.

In the preferred embodiment, a slip-hitch type trailer hitch can be used that may, in many instances, already be installed on the car. In FIG. 1, slip-hitch trailer hitch 10 is attached to the middle of hitch mounting bar 12 that is attached to the underside of the frame of the car in any convenient manner. Slip-hitch 10 is a tube having a square opening in it to receive mating square tow bar 14. Pin 16 holds the tow bar in the hitch.

Tow bar 14 extends rearwardly until it is beyond rear bumper 18 then it curves upwardly until the outer end is substantially vertical. Horizontal mounting plate 20 is attached to the end of the tow bar. Clamped to the top of the mounting plate is rack supporting member 22, which is attached to the mounting plate by plate 24 and bolt 26. The rack supporting member is a hollow square tube that supports bearing housing 28 which in turn supports lead screw 30 (FIG. 4) for rotation by motor 32 through gear box 34.

L-shaped lift member 36 includes vertical arm 36a and horizontal U-shaped arm 36b that is connected to the lower end of vertical arm 36a. Vertical arm 36a is square or rectangular in cross-section and extends into rack supporting member 22. Nut 38 is mounted at the upper end of the central opening in vertical arm 36a as shown in FIG. 4. The nut has internal threads that engage the threads on lead screw 30 so that rotation of the lead screw by motor 32 will cause vertical arm 36a to move vertically relative to rack supporting member 22.

A pair of chair supporting members 40 and 42 are mounted on horizontal U-shaped lifting arm 36b. The chair supporting members are positioned to engage horizontal frame members 44 and 46 to support the chair as it is raised from the ground and lowered back to the ground by the rack of this invention. Horizontal members 44 and 46 are part of the framework of the wheelchair that supports the seat and transfers the weight of the occupant of the wheelchair to the wheels of the wheelchair in a manner that is well-known to those skilled in the art. Lifting arm 36b is U-shaped to accommodate wheel "W" when the chair is moved to position frame members 44 and 46 above the chair supporting member.

The wheelchair when it is to be raised by the rack, of course, will be in its folded condition so that the space between horizontal frame members 44 and 46 is relatively short.

Preferably, the chair supporting members are V-shaped in cross-section so that the horizontal members will be held against lateral movement by the weight of the chair.

Figure 2:
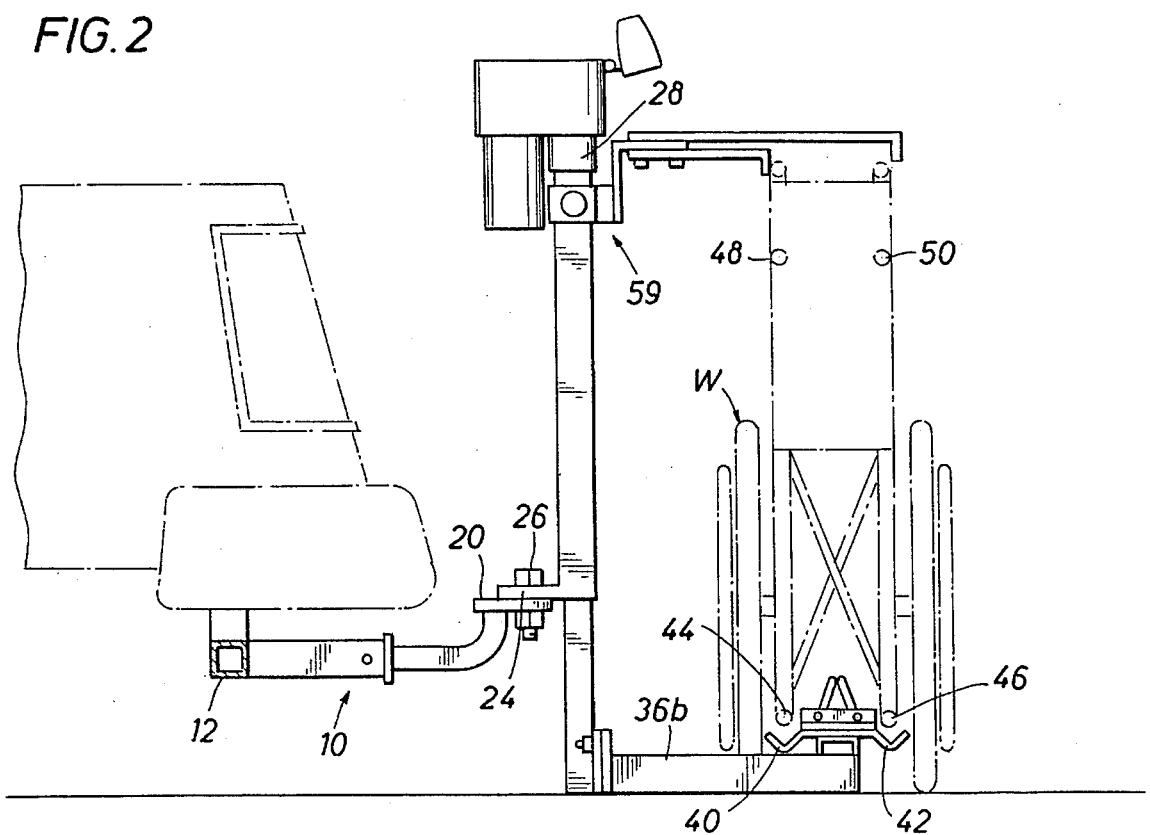
FIG. 2 is a view from the side of the car showing the rack in solid lines and the wheelchair in dashed lines, with the rack positioned to receive the wheelchair or after the wheelchair has been released from the rack.
Figure 3:
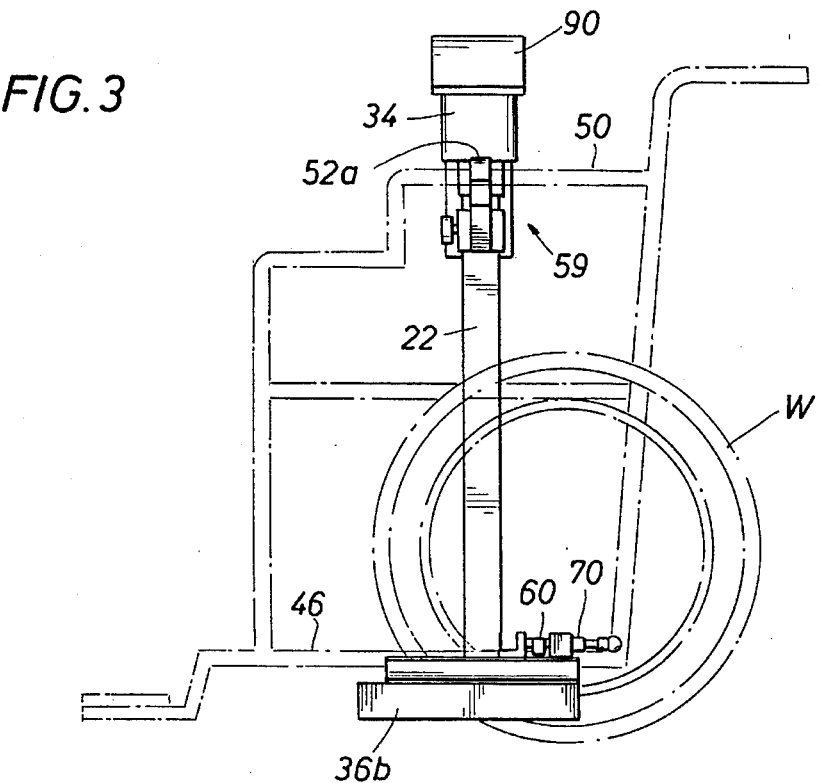
FIG. 3 is a view of the rack and the wheelchair of FIG. 2 taken from the back of the car.

As shown in FIG. 2, upward movement of horizontal arm 36b by the upward movement of arm 36a by lead screw 30 will move chair support members 40 and 42 upwardly into engagement with frame members 44 and 46 and move the chair upwardly until arm rests 48 and 50 move into engagement with upper clamp member 52 which along with lower clamp member 54, is mounted on rack supporting member 22 by bracket 59. Downwardly extending lugs 52a and 54a will be spaced apart as shown in FIG. 2 and FIG. 4 to receive the arm rests. Then when the arm rests move into position between the lugs, the lower clamp member is moved to the right by releasing screws 56 to clamp arm rests 48 and 50 between the two downwardly extending lugs and secure the upper portion of the chair from lateral movement. Thus, with the bottom portion of the frame and the chair securely supported by support members 40 and 42 and the upper portion of the chair being held against lateral movement by arm 52 and 54, the chair is secured for travel over bumpy roads and the like without danger of being released from the rack.

Figure 5:
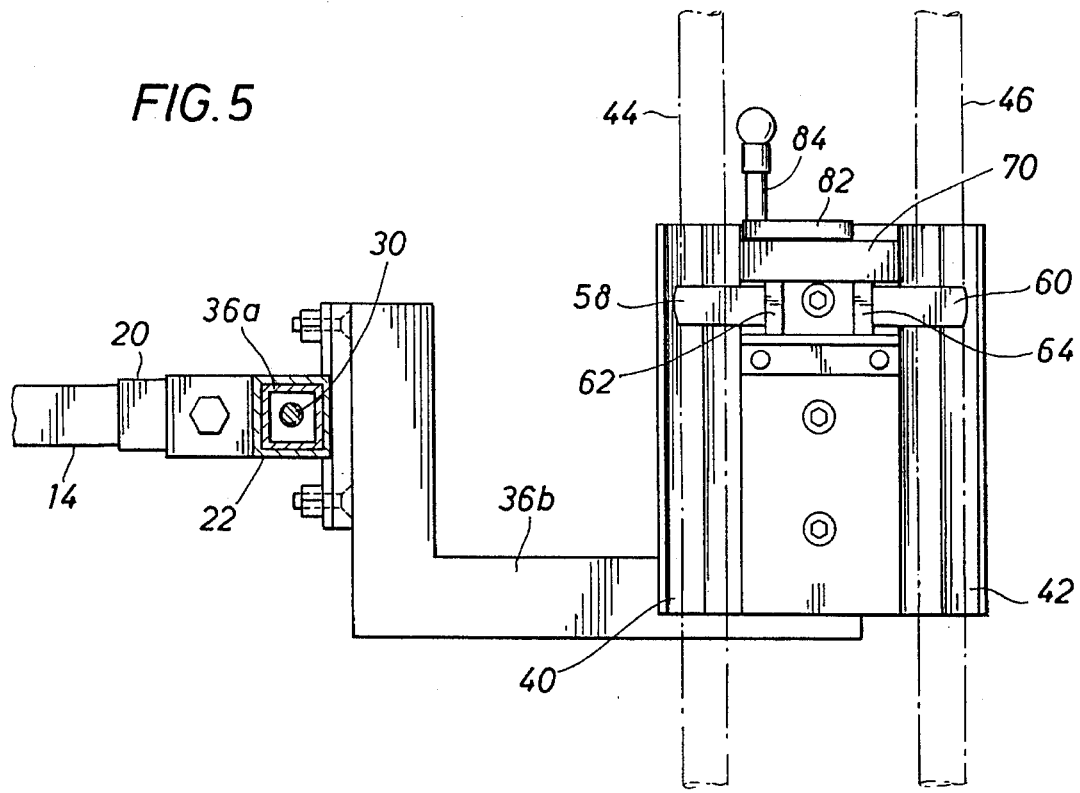
FIG. 5 is a sectional view taken along line 5—5 of FIG. 4.

Additional security for the chair is provided by fingers 58 and 60. As shown in FIG. 5, these fingers extend across frame members 44 and 46 to securely hold the frame members in the V-shaped support members. The fingers are mounted on square shafts 62 and 64. The square shafts are connected to round shafts 66 and 67 that extend into gear box 70 and support gears 72 and 74 for rotation. These gears are also keyed to shafts 66 and 68 so that rotation of the gears will rotate the shafts. Gears 76 and 78 are between gears 72 and 74. The teeth of all these gears are meshed so that they form a gear train, as shown in FIG. 7, with the result that rotation of one gear will cause the rotation of the other three. Gear 78 is supported for rotation by shaft 80 that is rotated by crank arm 82. Rotation of the crank arm upwardly, as viewed in FIG. 6, will cause shaft 68 to rotate finger 60 upwardly away from frame portion 46 of the wheelchair and, at the same time, through gear 76 rotate gear 72 in the opposite direction to rotate finger 58 upwardly away from frame portion 44. Rotation of the crank in the other direction, of course, will move the fingers into position as shown in FIG. 4 to hold the frame portions on the support members.

Spring loaded pin 84 is carried by crank 82 so that upward force on ball 86 will move the pin out of engagement with opening 88 in the sidewall of the gear box and allow the crank to be moved. After the fingers have been moved into engagement with the frame members, the pin then can be inserted in opening 86 and lock the fingers in their holding position.

Tail light 90 mounted on gear box 34 and connected to the electric system of the automobile provides an additional tail light for the vehicle.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A rack for mounting on the rear of a car for carrying a wheelchair, said wheelchair having a seat supporting framework that includes two parallel horizontal frame members close to the ground, said rack comprising a pair of chair support members including two spaced-apart channels that extend horizontally for engaging the two horizontal frame members close to the ground along the respective longitudinal axes of the frame members to support the chair on the rack, an L-shaped lift member having a horizontal arm upon which the support members are mounted and a vertical arm, and means for moving the L-shaped lift member upwardly to raise the chair to a traveling position above the ground and to lower the chair downwardly to a position adjacent the ground for removing the chair from the rack.

2. The rack of claim 1 in which the vertical arm of the L-shaped member is hollow and the means for moving the L-shaped support member vertically is a threaded nut mounted in the hollow vertical arm, a vertical lead screw engaging the nut and means for rotating the lead screw in one direction to raise the L-shaped member and in the other direction to lower the L-shaped member.

3. The rack of claims 1, or 2 further including clamps having fingers mounted on two shafts that extend parallel to the support members, a gear box mounted on the support members for supporting the shafts, a gear train in the gear box, the outer gears of which are mounted on the shafts to rotate the shaft as the gears rotate, a handle for rotating one of the gears to rotate the outer gears whereby the fingers will be rotated between a position extending upwardly to allow the frame members of the wheelchair to move into and out of engagement with the support members and a position with the fingers extending across the frame members to hold the frame members on the support members, and means for locking the handle against movement when the fingers are in position to hold the frame members on the support members.

4. The rack of claim 1 further provided with clamps for holding the horizontal frame members on the chair support members.

5. The rack of claim 1 in which the horizontal arm of the L-shaped lift member is U-shaped.

\* \* \* \* \*